United States Patent [19]

Davidsson

[11] Patent Number: 5,318,408
[45] Date of Patent: Jun. 7, 1994

[54] LUBRICATING SUSPENSION FOR PUMPING CONCRETE

[75] Inventor: Nils Davidsson, Järfälla, Sweden

[73] Assignee: Sika AG, vorm. Kaspar Winkler & Co., Zurich, Switzerland

[21] Appl. No.: 981,212

[22] Filed: Nov. 25, 1992

[30] Foreign Application Priority Data

Oct. 23, 1992 [EP] European Pat. Off. ......... 92118151.7

[51] Int. Cl.$^5$ ............................................. B65G 53/32
[52] U.S. Cl. ...................................... 417/53; 417/572; 417/900; 406/47
[58] Field of Search ................. 417/53, 572, 900; 406/46, 47

[56] References Cited

U.S. PATENT DOCUMENTS

| | | | |
|---|---|---|---|
| 2,046,434 | 7/1935 | Touhey | 406/47 |
| 2,920,923 | 1/1960 | Wasp et al. | 406/47 |
| 3,012,826 | 4/1960 | Puff et al. | 406/47 |
| 5,193,942 | 3/1993 | Berry et al. | 406/46 |

FOREIGN PATENT DOCUMENTS

| | | |
|---|---|---|
| 222932 | 5/1987 | European Pat. Off. . |
| 61-141651 | 6/1986 | Japan . |
| 62-078138 | 4/1987 | Japan . |
| 7002123 | 8/1970 | Netherlands ........................ 406/46 |
| WO9103437 | 3/1991 | PCT Int'l Appl. . |
| 674235A5 | 5/1990 | Switzerland . |
| 1134496 | 1/1985 | U.S.S.R. ............................. 406/47 |
| 2162142A | 1/1986 | United Kingdom . |

Primary Examiner—Richard A. Bertsch
Assistant Examiner—Roland G. McAndrews, Jr.
Attorney, Agent, or Firm—Burns, Doane, Swecker & Mathis

[57] ABSTRACT

A method for the start up of a concrete pump using a small amount of an aqueous suspension of polymers, amorphous silicone dioxide and water-reducer rather than a conventional cement slurry.

20 Claims, 1 Drawing Sheet

LUBRICATING SUSPENSION FOR PUMPING CONCRETE

This invention relates to a new method to start up a concrete pump. More particularly, it relates to a lubricating suspension for concrete pumps, pipes and hoses.

BACKGROUND OF THE INVENTION

Pumping concrete is often more economical than conventional methods of transporting concrete from a mixing plant to formwork. It enables a continuous feed of concrete to be placed at high speed with access to every part of the site. Concrete pumping is sometimes the only possible placing method where the job is inaccessible or the timescale of the construction work makes slower methods impractical.

The transport and placing of concrete by pump is an increasingly popular method. It is very fast and efficient and results in little waste of concrete. Not all concrete will pump, however, and minor variations in the concrete mix can make an otherwise pumpable mix completely unpumpable. The sand grading is particularly important and variations in grading can rapidly cause unpumpability. Even if only a small part of the mix in the hopper proves to be unpumpable, the pump may become blocked, leading to a time-consuming and expensive delay while the pump is stripped down, and the blockage removed.

A common problem associated with concrete pumps results during the starting phase. The pipes are dry and most likely covered with a thin layer of cement from previous pumpings.

When starting up, the concrete will gradually dehydrate while passing through the dry pipes. This creates a plug before reaching the end of the pipe. It is time consuming to disassemble the pump and remove the plug.

Before pumping concrete, the pump and pipeline must be grouted with about 500 liters of a cement slurry or rich mortar in accordance with the pump manufacturer's recommendations. Pumping should be started immediately after grouting. The aforementioned recommendations typically include the following steps:

1. Pour slurry or mortar into hopper while operating the pump slowly;
2. Discharge excess grout to waste, not into formwork;
3. Retain some grout in the hopper to be remixed with the first hopper full of concrete; and
4. Fit the protecting grill on the hopper before loading concrete.

When pumping downhill, a tight plug of damp cement bags or a sponge rubber ball should precede the grout to ensure that the walls of the pipe are properly lined.

Unfortunately the above procedure results in some new disadvantages. For example, the concrete mixing plant has to mix the cement slurry separately which takes time and money relative to the normal production. Also, present standards and regulation prohibit transport of the cement slurry in the same truck, at the same time, as the construction concrete. In this regard, if regulations are broken, or do not exist, the cement slurry is often put on top of the construction concrete in the lorry. This risks mixing during transport which will negatively influence concrete quality. Additionally, since the cement slurry must not be mixed with the concrete, it must be unpumped on the outside of the mould, and removed as waste.

SUMMARY OF THE INVENTION

Accordingly, it is the object of the invention to provide a process which effectively addresses the aforementioned drawbacks of the prior art procedures. In particular, the invention provides a technique to start up a concrete pump which includes introducing a novel lubricating suspension into a pumping system prior to introducing the concrete.

In another aspect of the invention the lubricating suspension can be introduced into the pumping system after the concrete has been pumped thereby reducing the need for prewatering prior to the next use.

In any pumping system it is the material that contains the pressure gradient which allows the pumping process to take place. The pump creates the pressure and transfers it to the material, and the design of the pump determines how effectively this is carried out.

Any saturated combination of solids and liquid has a segregation pressure. This is the pressure required to separate liquid and solids, thus transferring pressure from the liquid phase to the solids. When this occurs, the combination becomes an unpumpable material. The objective of the invention is to produce a suspension of liquid and solids, with a segregation pressure greater than the pressure required to pass it through the pump and pipeline.

A high viscous aqueous suspension of silica fume and dispersed polymer containing a water-reducer or high-range water-reducer according to ASTM C 494 can eliminate all the mentioned disadvantages. In this regard, it has been found that the replacement of 50 liters of cement slurry by only 5 liters of lubricating suspension according to the invention can result in a significantly faster pumping process at a drastically reduced cost.

A feature of suspensions is that, when they are sheared, migration of the fine material tends to occur and this tends to produce on the wall of the pipe a layer of grout that acts as a lubricant. If the mix is particularly rich, however, this grout layer itself has a high resistance to shear at the interface between the concrete and the pipe wall. The lubrication at this interface has a direct bearing on the pressure required to force the concrete through the pipeline. If a layer of liquid of thin grout can be formed along the wall of the pipe this provides the necessary lubrication.

DETAILED DESCRIPTION OF PREFERRED EMBODIMENTS

Figure 1A:
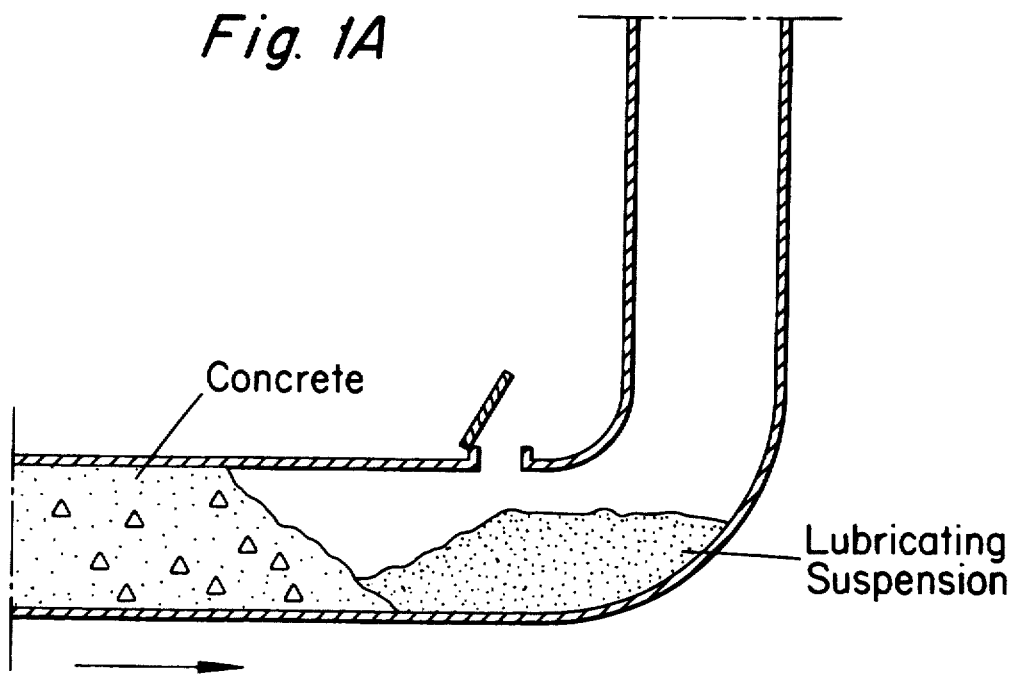
FIGS. 1A and 1B illustrate the flow of the lubricating suspension and concrete according to the invention.

As noted above, the invention relates to a method for the start up of a concrete pump, by first introducing a lubricating suspension into the pump, the pipe or the hose (hereinafter the pumping system) prior to pumping the concrete or mortar. The lubricating suspension preferably comprises: (i) at least one water dispersable polymer, (ii) amorphous silicon dioxide, and (iii) water. Optionally, the suspension can also contain one or more of (iv) at least one dispersing aid, (v) at least one viscosity controlling agent, and (vi) at least one water-reducing agent and/or high-range water reducing agent.

Preferably, the suspension contains 1–60% by weight water dispersable polymer(s). Such polymers may be homo and copolymers of vinyl esters, acrylic acid esters, styrene, butadiene, and vinyl-halogen compounds.

The suspension can contain 5–75% by weight amorphous silicon dioxide. The amorphous silicon dioxide material preferably has a BET specific surface of from 10 to 400 m$^2$/g (Brunauer-Emmet-Teller), and an SiO$_2$ content of 50 to 100% by weight.

The suspension can contain 24–94% by weight water.

If used, the dispersing aid should be present in an amount of up to 5% by weight. Suitable dispersing aids include polyacrylic acid and magnesium silicate based dispersing aids.

For best results, the suspension should not flow away or separate from the concrete or mortar front. To assist in this object, the suspension can contain a viscosity controlling agent(s). The suspension can contain up to 15% by weight of the viscosity controlling agent(s). Suitable viscosity controlling agents include those derived from cellulose, alginates, polyethylene-oxide, xanthane, and polysaccharides. Such agents are particularly useful in situations where the concrete or mortar must flow downward through the pumpinq system. The viscosity controlling agents will also reduce the risk that the suspension will mix too quickly with the concrete.

The use of water reducers and/or high range water-reducers will keep the concrete or mortar wet during its transport through the pumping system. Up to 20% by weight of water-reducers and/or high range water-reducers can be used. Examples of water-reducers and high range water-reducers include sulfonated melamine-formaldehyde resins, sulfonated naphthalene-formaldehyde resins, sulfonated vinylcopolymers, sulfonic acid-melamine resins, urea resins, lignin sulfonates, and salts of hydroxy- or polyhydroxy-carboxylic acids.

In operation 5–10 liters of suspension can be placed as a lubrication lump ahead of the concrete front. It replaces prewatering and cement slurries in the starting phase.

When the pumping starts the suspension is pushed ahead of the construction concrete through the pipes. The following will happen:

the polymer dispersion will stick on the surfaces in the pipes;

silica fume will stick on the surfaces in the pipes and will cover 100 times bigger surface than cement; and high-range water-reducer will keep the concrete wet during its transport through the pipes.

Figure 1B:
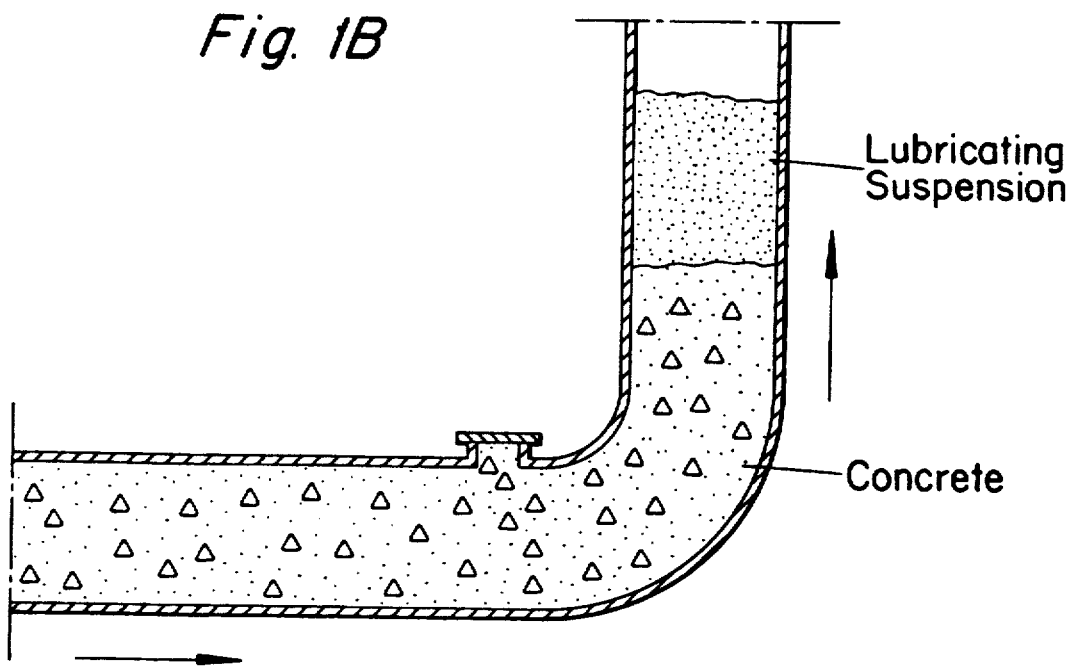

The aforementioned procedure is also illustrated in FIGS. 1A and 1B.

For example, 5–10 liters of suspension can be poured in the end of the pipe after pumping is finished. As noted above, another aspect of the invention relates to the use of the lubricating suspension after the concrete or mortar has been pumped, thereby reducing the need for prewatering prior to the next use. Thereafter a cleaning spunge (foam rubber) is placed in the pipe and the pump is driven backwards as it normally would be when cleaned. A very thin layer of suspension sticks to the surface on the inside of the pipes, and it stays fresh for up to 3 days. There is no need for prewatering when starting the pump again. The use of a thickener can further increase the potlife according to this embodiment.

What is claimed is:

1. In a method comprising pumping concrete or mortar through a concrete or mortar pumping system, introducing a lubricating phase into the pumping system prior to the introduction of, or downstream relative to the front edge flow boundry, of said concrete or mortar, wherein said lubricating phase comprises an aqueous suspension of (i) at least one water-dispersed polymer, and (ii) an amorphous silicon dioxide material, and wherein after introduction said lubricating phase is effective for providing a suspension of liquids and solids in the pumping system with a segregation pressure greater than the pressure required to pass the suspension through the pumping system.

2. A method according to claim 1, wherein said aqueous suspension comprises 1 to 60% by weight water dispersed polymer(s), 5 to 75% by weight amorphous silicon dioxide material, and 24 to 94% by weight water.

3. A method according to claim 1, wherein said water-dispersed polymer(s) is/are selected from the group consisting of homo and copolymers of vinyl esters, acrylic acid esters, styrene, butadiene, and vinyl-halogen compounds.

4. A method according to claim 1, wherein said amorphous silicon dioxide material comprises 50 to 100% by weight silicon dioxide.

5. A method according to claim 4, wherein the amorphous silicon dioxide has a BET specific surface of 10 to 400 m$^2$/g.

6. A method according to claim 1, wherein said aqueous suspension further comprises (iii) at least one member of the group consisting of water reducing agents and high-range water reducing agents.

7. A method according to claim 6, wherein said water reducing agent(s) and high-range water reducing agent(s) is/are selected from the group consisting of sulfonated melamine-formaldehyde resins, sulfonated naphthalene-formaldehyde resins, sulfonated vinyl copolymers, sulfamic acid-melamine resins, urea resins, lignin sulfonates, or salts of hydroxy- or polyhydroxy carboxylic acids.

8. A method according to claim 6, wherein said aqueous suspension comprises 1 to 60% by weight water dispersed polymer(s), 5 to 75% by weight amorphous silicon dioxide material, up to 20% by weight of at least one member of the group consisting of water reducing agents and high-range water reducing agents, and 24 to 94% by weight water.

9. A method according to claim 8, wherein said aqueous suspension comprises 1 to 60% by weight water dispersed polymer(s), 5 to 75% by weight amorphous silicon dioxide material, up to 20% by weight of at least one member of the group consisting of water reducing agents and high-range water reducing agents, up to 5% by weight dispersing aid(s), up to 15% by weight viscosity controlling agent(s), and 24 to 94% by weight water.

10. A method according to claim 6, wherein said aqueous suspension further comprises at least one of (iv) at least one dispersing aid and (iv) at least one viscosity controlling agent.

11. A method according to claim 10, wherein said aqueous suspension comprises 1 to 60% by weight water dispersed polymer(s), 5 to 75% by weight amorphous silicon dioxide material, up to 20% by weight of at least one member of the group consisting of water reducing agents and high-range water reducing agentsand, up to 5% by weight dispersing aid(s), up to 15% by weight viscosity controlling agent(s), and 24 to 94% by weight water.

12. A method according to claim 10, wherein said aqueous suspension further comprises both (iv) at least one dispersing aid and (iv) at least one viscosity controlling agent.

13. A method according to claim 10, wherein said dispersing aid(s) is/are selected from the group consisting of poly-acrylic acid and magnesium silicate derivatives.

14. A method according to claim 10, wherein said viscosity controlling agent(s) is/are selected from the group consisting of cellulose derivatives, alginates, polyethylene-oxides, xanthane, and polysaccharides.

15. A method comprising pumping concrete or mortar through a concrete or mortar pumping system, wherein after pumping said concrete or mortar through the pumping system a lubricating phase is introduced into the pumping system, wherein said lubricating phase comprises an aqueous suspension of (i) at least one water-dispersed polymer, and (ii) an amorphous silicon dioxide material.

16. A method according to claim 15, wherein said amorphous silicon dioxide material comprises 50 to 100% by weight silicon dioxide.

17. A method according to claim 4, wherein the amorphous silicon dioxide has a BET specific surface of 10 to 400 $m^2/g$.

18. A method according to claim 15, wherein said aqueous suspension further comprises (iii) at least one member of the group consisting of water reducing agents and high-range water reducing agents.

19. A method according to claim 18, wherein said aqueous suspension further comprises at least one of (iv) at least one dispersing aid and (iv) at least one viscosity controlling agent.

20. A method according to claim 18, wherein said aqueous suspension further comprises both (iv) at least one dispersing aid and (iv) at least one viscosity controlling agent.

* * * * *